(12) United States Patent
Huang et al.

(10) Patent No.: US 9,193,073 B1
(45) Date of Patent: Nov. 24, 2015

(54) ROBOT CALIBRATION APPARATUS FOR CALIBRATING A ROBOT ARM

(71) Applicant: QUANTA STORAGE INC., Taoyuan County (TW)

(72) Inventors: Chung-Hsien Huang, Taoyuan County (TW); Shao-Ji Shia, Taoyuan County (TW); Jen-Chen Wu, Taoyuan County (TW)

(73) Assignee: QUANTA STORAGE INC., Taoyuan (TW)

( * ) Notice: Subject to any disclaimer, the term of this patent is extended or adjusted under 35 U.S.C. 154(b) by 0 days.

(21) Appl. No.: 14/514,408

(22) Filed: Oct. 15, 2014

(51) Int. Cl.
*G05B 19/18* (2006.01)
*B25J 9/16* (2006.01)

(52) U.S. Cl.
CPC .............. *B25J 9/1692* (2013.01); *Y10S 901/02* (2013.01); *Y10S 901/47* (2013.01)

(58) Field of Classification Search
CPC ..... B25J 9/1692; Y10S 901/02; Y10S 901/47
USPC ................... 701/245, 248, 252, 254
See application file for complete search history.

(56) References Cited

U.S. PATENT DOCUMENTS

| 4,398,720 A | * | 8/1983 | Jones | ................ | A63F 3/00643 273/238 |
| 5,951,475 A | * | 9/1999 | Gueziec | ................ | A61B 19/52 128/922 |
| 2003/0144765 A1 | * | 7/2003 | Habibi | ................ | B25J 9/1697 700/259 |
| 2004/0172164 A1 | * | 9/2004 | Habibi | ................ | B25J 9/1692 700/245 |

\* cited by examiner

*Primary Examiner* — Ian Jen
(74) *Attorney, Agent, or Firm* — Winston Hsu; Scott Margo

(57) ABSTRACT

An encoded calibrating plate is fixed on the working environment of the robot arm and has a chessboard pattern with each square in the chessboard pattern being an encoding. The encoding indicates direction or position on the encoded calibration plate. A visual system of the robot arm captures an image of the encoded calibrating plate, calculates the coordinates encoding of the encoded calibration plate, and positions the visual system to calibrate a positioning error of the robot arm and the visual system.

13 Claims, 5 Drawing Sheets

ROBOT CALIBRATION APPARATUS FOR CALIBRATING A ROBOT ARM

BACKGROUND OF THE INVENTION

1. Field of the Invention

The present invention presents a robot calibration apparatus and method for calibrating a robot arm, and more particularly, a robot calibration apparatus and method for calibrating a robot arm by determining moving errors.

2. Description of the Prior Art

With the rapid development of industrial production technology, factory production lines are having robot arms perform product handling, arrangement, or assembly in place of human laborers to increase speed of production, stabilize product quality, and reduce labor cost. The robot arms further includes the use of visual system to determine a position and orientation of an object. The visual system guides the robot arm to automatically and accurately grab an object in the production process. Therefore, a method to reduce positioning error of the visual system and a method to calibrate the accuracy of the movement of the robot arm have become an important topic.

FIG. 1 illustrates a diagram of a calibrating plate 10 for a robot arm according to a prior art. The calibrating plate has a chessboard having interchanging black squares 11 and white squares 12. During calibration of the robot arm using the calibrating plate 10, a visual system of the robot arm is used. The visual system comprises an eye in hand camera configured to guide the robot arm when grabbing an object and an eye to hand camera configured to monitor a working environment of the robot arm. When calibrating using the eye in hand camera fixed on the robot arm, the eye in hand camera is brought close to the standard calibration plate 10 by moving the robot arm to capture an image of the standard calibration plate 10. According to the captured image, the position of the robot arm relative to the standard calibration plate is calculated to complete the calibration of the robot arm.

There are several calibration methods using the standard calibration plate. For example, U.S. Pat. No. 6,985,175 is configured to use two cameras to capture images of the status of the standard calibration plate and perform comparison to calibrate the two cameras. Another example, CN102927908 is configured to use a laser apparatus to project light strip for performing alignment of standard calibration plate. The camera fixed on the robot arm is used to capture image of the light strip. The laser apparatus is moved to another position and another image of the light strip projected by the laser apparatus at another angular position is captured. The intersection of the two light strips from two different angular positions is used to calibrate position of the robot in a three-dimensional space.

However, the standard calibration plate of the prior art has a fixed number of black and white squares in the chessboard pattern. If the robot arm is set on a limited space and the distance between the robot arm and the standard calibration plate is fixed, the visual system arranged on the robot arm is not able to capture the entire image of the standard calibration plate. It would not be possible to determine the orientation and position of the visual system using the partial image of the standard calibration plate. Thus, it is hard to determine the correct position of the visual system relative to the standard calibration plate to perform calibration. Therefore, existing method of calibrating robot arm still has problems that need to be solved.

SUMMARY OF THE INVENTION

An objective of the present invention is to provide a robot calibration apparatus for a robot arm. A plurality of encodings are arranged on an encoded calibrating plate of the robot calibration apparatus. Each encoding corresponds to a predetermined coordinate. A visual system of the robot calibration apparatus is configured to capture an image of an encoding of a part of the encoded calibrating plate to quickly perform position calibration of the visual system to increase the flexibility of space used by the robot arm.

Another objective of the present invention is to provide a method for calibrating a robot arm. A visual system of the robot calibration apparatus is focused on an encoded calibrating plate and captures an image of the encoded calibrating plate. Coordinates of an encoding is calculated and positioning of the visual system is performed to determine moving error of the robot arm used for calibrating movement of the robot arm.

A further objective of the present invention is to provide another method for calibrating a robot arm. A visual system of the robot calibration apparatus is focused on several positions of an encoded calibrating plate and captures images of the encoded calibrating plate. An average of moving errors of the robot arm is calculated to increase the accuracy of calibration of movement of the robot arm.

An additional objective of the present invention is to provide a further method for calibrating a robot arm. Positioning of an eye in hand camera and positioning of an eye to hand camera of the robot arm are separately performed using an encoded calibrating plate to calibrate the movement of the robot arm.

To achieve the objectives of the present invention, a robot calibration apparatus of the present invention includes a robot arm having a fixed end fixed on a base and a movable end where an eye in hand camera of a visual system is fixed on. An encoded calibrating plate is fixed on the working environment of the robot arm using a support frame and has fixed coordinates relative to the robot arm. The encoded calibrating plate has a chessboard pattern. Each square of the chessboard pattern has an encoding to indicate an orientation of the encoded calibrating plate or a position on the encoded calibrating plate. A controller is configured to receive images from the visual system and control a movement of the eye in hand camera fixed on the movable end of the robot arm for capturing an image of an encoding of the encoded calibrating plate. The image is used to calibrate a positioning error between coordinates of the eye in hand camera with respect to the fixed end of the robot arm. The visual system further comprises an eye to hand camera. The eye to hand camera is fixed outside the robot arm. The eye to hand camera has fixed coordinates relative to the robot arm. The controller moves the movable end of the robot arm to positions of the plurality of encodings of the encoded calibrating plate to capture images that are used to correct a positioning error of coordinates of the eye to hand camera with respect to the fixed end of the robot arm.

The squares of the chessboard pattern of the encoded calibrating plate are alternating black squares and white squares. Each of The black squares has an icon positioned near a corner as an orientation encodings for indicating that an origin of the encoded calibration plate is close to a corresponding corner of the encoded calibration plate. The white squares has encoding icons including hollow icons and solid icons arranged and grouped together to form a coordinates encoding for indicating the positions of the white squares on the encoded calibration plate relative to an origin of the encoded calibration plate. The encoding circles in the white square are arranged in two columns. A first column of the two columns represents an X-coordinate of the encoded calibration plate. A second column of the two columns represents a Y-coordinate of the encoded calibration plate. An encoding icon in row A, an encoding icon in row B, and an encoding icon in row C from bottom to top represent $2^0$, $2^1$ and $2^2$ respectively, equations for calculating the X-coordinate and the Y-coordinate are as follows:

$$X=A*2^0+B*2^1+C*2^2$$

$$Y=A*2^0+B*2^1+C*2^2$$

A method of calibrating a robot arm includes positioning a visual system of the robot arm to have at least a part of an encoded calibrating plate within a photographic range of the visual system, focusing the visual system to capture an image of the encoded calibrating plate, determining position of the visual system according to coordinates indicated in a coordinates encoding in the image of the encoded calibration plate and a focus of the eye in hand camera, comparing the coordinates of the eye in hand camera before and after positioning to calculate a moving error, and calibrating the position of the eye in hand camera.

The visual system of the method of calibrating a robot arm comprises an eye to hand camera and eye in hand camera. calibrations of the positioning of the eye to hand camera and eye in hand camera are implemented separately. After calibrating the position of the eye in hand camera, when the number of calibration times is less than a predetermined number, the robot arm is moved to a different position and calibration operation is repeated. When the number of calibration times is equal to the predetermined number, an average of the moving errors determined during calibration operations is calculated.

These and other objectives of the present invention will no doubt become obvious to those of ordinary skill in the art after reading the following detailed description of the preferred embodiment that is illustrated in the various figures and drawings.

DETAILED DESCRIPTION

To achieve the objective of the present invention, preferred embodiments of the present invention are described in the following paragraphs together with some illustrations.

Figure 1:
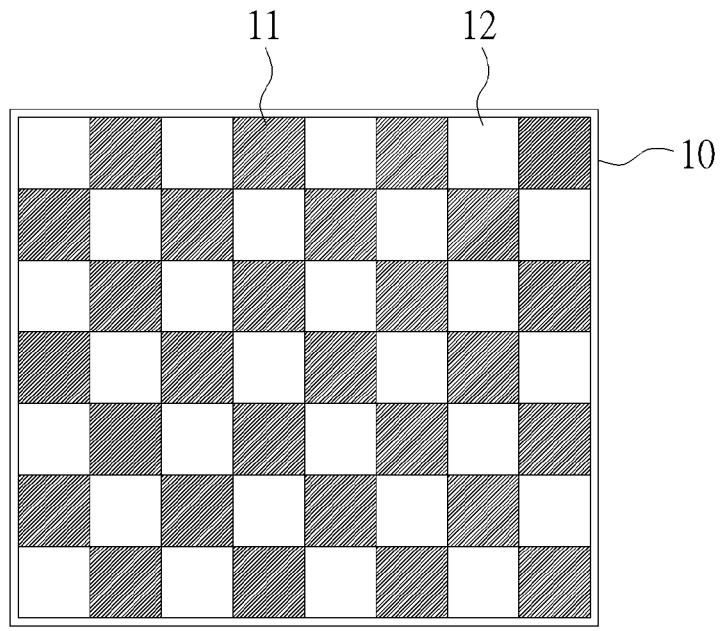
FIG. 1 illustrates a diagram of a calibrating plate for a robot arm according to a prior art.
Figure 2:
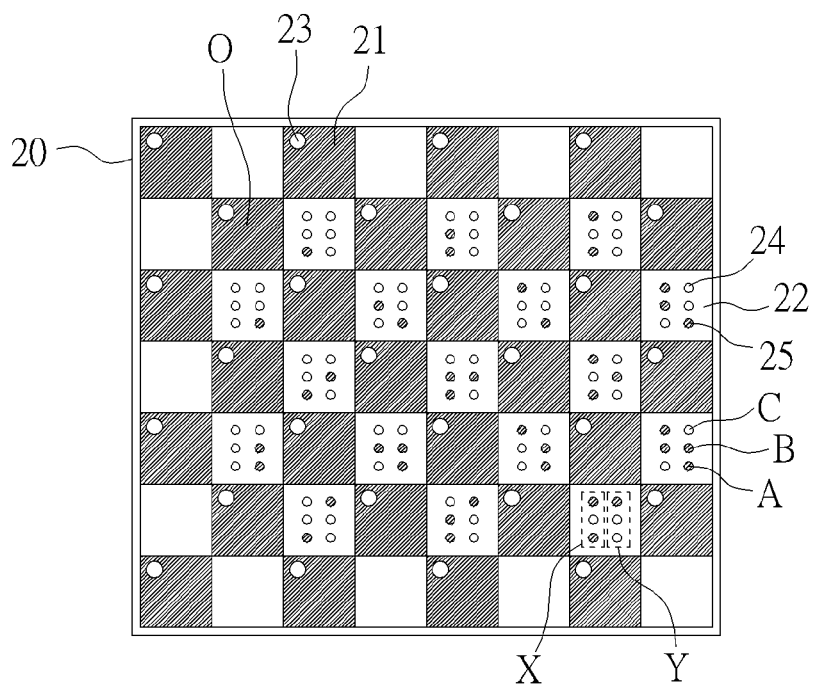
FIG. 2 illustrates a diagram of an encoded calibration plate of a robot calibration apparatus according to an embodiment of the present invention.

FIG. 2 illustrates a diagram of an encoded calibration plate 20 of a robot calibration apparatus according to an embodiment of the present invention. The encoded calibration plate 20 may have a chessboard pattern. The chessboard pattern may comprise of interchanging black squares 21 and white squares 22. The black squares 21 may have orientation encodings for indicating an orientation of the encoded calibration plate 20 and the white squares 22 may have coordinates encodings for indicating positions on the encoded calibration plate 20. An orientation encoding of a black square 21 may include an icon 23 positioned near a corner of the black square 21 to indicate that an origin O of the encoded calibration plate 20 may be close to a corresponding corner of the encoded calibration plate 20. A coordinates encoding in a white square 22 may comprise encoding icons arranged in a matrix to indicate a position of the white square 22 relative to the origin O of the encoded calibration plate 20. In an embodiment, the encoding icons in a white square 22 may comprise of only solid icons 25, or a combination of both hollow icons 24 and solid icons 25 arranged in two columns. As shown in FIG. 2, a first column on one side of the white square 22 may be used to represent an X-coordinate of the encoded calibration plate 20 and a second column on another side of the white square 22 may be used to represent a Y-coordinate of the encoded calibration plate 20. Each of the X-coordinate and Y-coordinate may be represented by a combination of an encoding icon in row A, an encoding icon in row B, and an encoding icon in row C. Each encoding icon may represent a binary bit. Encoding icons from row A may have a binary weight of $2^0$, encoding icons from row B may have a binary weight of $2^1$, and encoding icons from row C may have a binary weight of $2^2$. The hollow icons 24 may represent a bit 0 value and the solid icons 25 may represent a bit 1 value. Equations for calculating the X-coordinate and the Y-coordinate of a white square 22 are as follows:

$$X=A*2^0+B*2^1+C*2^2$$

$$Y=A*2^0+B*2^1+C*2^2$$

For example, in one of the white squares 22, the first column may comprise a hollow icon 24 in row A to indicate a bit 0 value and a solid icon 25 in row B and row C to indicate a bit 1 value, hence A=0, B=1, and C=1; and the second column may comprise a solid icon 25 in row A to indicate a bit 1 value and a hollow icon 24 in row B and row C to indicate a bit 0 value, hence A=1, B=0, and C=0. Coordinates of the white square 22 described in this example may be calculated by substituting the values of the encoding icons to the above mentioned equation. The calculations are as follows:

$$X=0*2^0+1*2^1+1*2^2=6$$

$$Y=1*2^0+0*2^1+0*2^2=1$$

The calculated coordinates of the white square 22 of the example are (6,1). Therefore, the coordinates of the white square 22 with respect to the origin O of the encoded calibration plate 20 may be calculated using the hollow icons 24 and the solid icons 25 in the white square 22.

Figure 3:
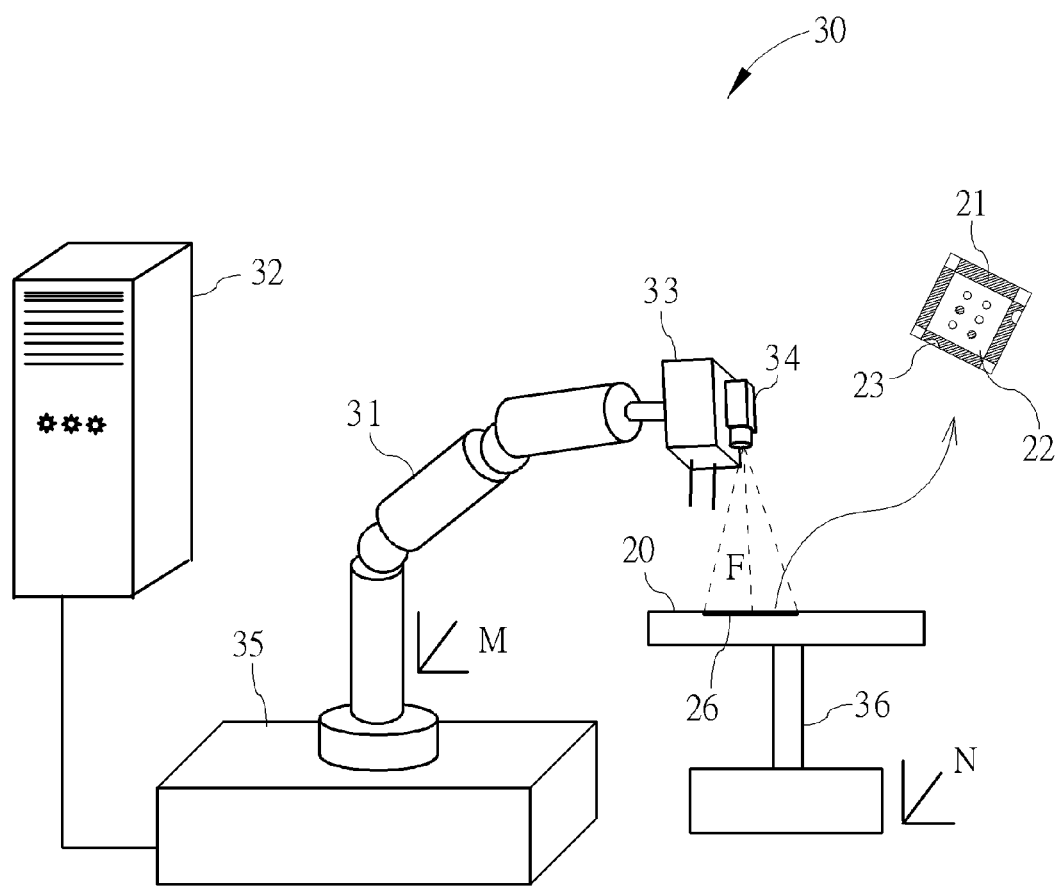
FIG. 3 illustrates a diagram of a robot calibration apparatus according to an embodiment of the present invention.

FIG. 3 illustrates a diagram of a robot calibration apparatus 30 according to an embodiment of the present invention. The robot calibration apparatus 30 may comprise a visual system, a robot arm 31, a controller 32 and an encoded calibrating plate 20. The visual system may comprise an eye in hand camera 34 arranged on the robot arm 31. The robot arm 31 may have a fixed end fixed on a base 35. The position on the base 35 where the fixed end is fixed may be taken as a reference point M. The robot arm 31 may also have a movable end where the eye in hand camera 34 is fixed. Before calibration operation, initial coordinates of the eye in hand camera 34 with respect to the reference point M may be set. Due to moving errors caused by multiple joints of the robot arm 31, positioning errors of the eye in hand camera 34 of the visual system may exist. To increase the accuracy of the movement of the robot arm 31, calibration of the positioning of the eye in hand camera 34 may be performed. To prepare for a calibration operation, a support frame 36 may be used to fix the encoded calibrating plate 20 within a working environment of the eye in hand camera 34 or the robot arm 31. The position where the support frame 36 is fixed may be taken as a reference point N. The position of the origin O in the encoded calibrating plate 20 with respect to the reference point N may be known. Hence, the position of the white squares 22 indicated by the coordinates encodings with respect to the reference point N may also be known. Also, the relative coordinates between the reference point M and the reference point N is fixed. Thus, the reference point N may have fixed coordinates correlation with the reference point M. The fixed coordinates correlation between the reference point N and reference point N may be used to determine the correct coordinates of the eye in hand camera 34 with respect to the reference point M.

When the robot calibration apparatus 30 is performing calibration, the controller 32 may be used to move the robot arm 31 to bring the eye in hand camera 34 towards the encoded calibrating plate 20. A focus F of the eye in hand camera 34 may be adjusted to capture a clear image 26 of the encoded calibrating plate 20. And through the focus F of the eye in hand camera 34, the distance between the eye in hand camera 34 and the encoded calibrating plate 20 may be determined. The image 26 may include a white square 22 having a coordinates encoding and at least one part of a black square having at least one part of an orientation encoding. At least one part of the icon 23 may be included in the at least one part of a black square captured in the image 26. The at least one part of the icon 23 may be used to indicate an orientation of the encoded calibrating plate 20 and the coordinates encoding in the white square 22 may be used to determine the coordinates of the white square 22 with respect to reference point N. Thus, using the focus F and the coordinates of the white square 22 with respect to reference point N, the position of the eye in hand camera 34 with respect to reference point N may be determined. The correct coordinates of the eye in hand camera 34 with respect to the reference point M may be determined using the fixed coordinates correlation between the reference point M and the reference point N. A moving error of the robot arm 31 may be determined by comparing the coordinates of eye in hand camera 34 with respect to the reference point M recorded in a memory of the controller 32 before calibration and the coordinates of eye in hand camera 34 with respect to the reference point M after calibration. The moving error may be stored in the memory of the controller 32.

The moving error of the robot arm 31 with respect to different position may vary due to the components and weight of the robot arm 31. Therefore, a plurality of moving errors may be determined by having the robot arm 31 controlled by the controller 32 move the eye in hand camera 34 through several different positions in the encoded calibrating plate 20. The eye in hand camera 34 may capture images of several different positions of the encoded calibrating plate 20 and perform calibration operation at the several different positions. The moving errors determined through the calibration operations may be saved in the memory of the controller 32 and an average of the moving errors may be determined. The average of the moving errors may be used to increase accuracy of the movement of the robot arm 31.

Figure 4:
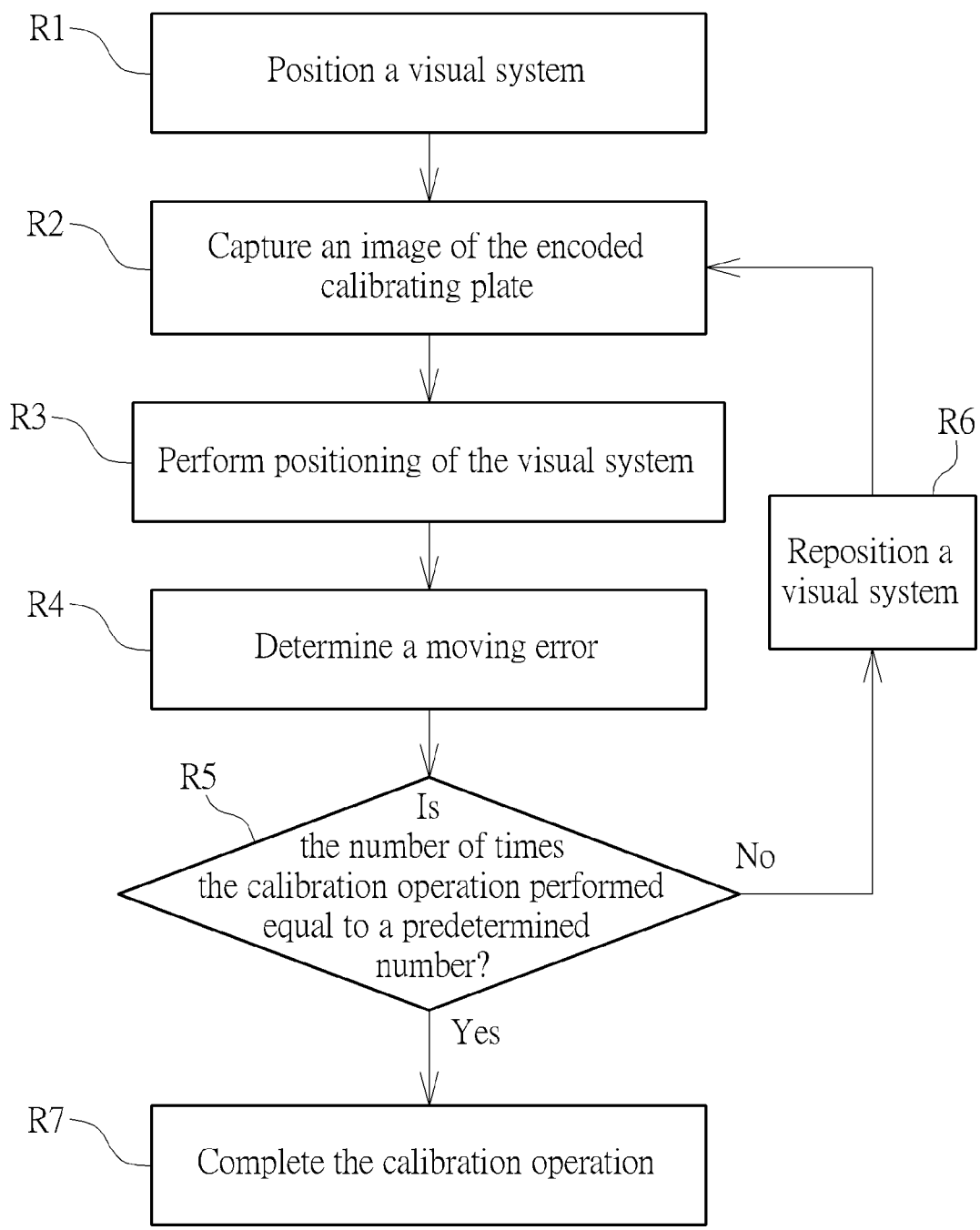
FIG. 4 illustrates a flowchart of a method of calibrating a robot arm in FIG. 3.

FIG. 4 illustrates a flowchart of a method of calibrating a robot arm in FIG. 3. The steps of the method of calibrating the robot arm may include but is not limited to the following steps:

Step R1: position a visual system of the robot arm to have at least apart of an encoded calibrating plate within a photographic range of the visual system;

Step R2: adjust a focus of the visual system and capture an image of the encoded calibrating plate;

Step R3: perform positioning of the visual system according to coordinates determined from a coordinates encoding of the image of the encoded calibrating plate, an orientation encoding of the image of the encoded calibrating plate, and a focus of the visual system;

Step R4: compare coordinates of the position of the visual system camera before calibration and the position of the visual system camera after calibration to determine a moving error;

Step R5: determine if the number of times the calibration operation performed is equal to a predetermined number; If so, go to step R7; if not, go to step R6;

Step R6: reposition the visual system to have another part of the encoded calibrating plate within a photographic range of the visual system; go to step R2; and Step R7: adapt to different moving errors of the robot arm to complete the calibration operation.

The robot calibration apparatus may be configured to use the coordinates encoding comprising of hollow icons and solid icons arranged in the white squares of the image captured by the visual system to determine coordinates of the visual system. Therefore, the robot calibration apparatus need not capture the whole area of the encoded calibrating plate to determine the position of the visual system. Thus, flexibility of space needed to be used by the robot arm during calibration operation may be achieved. Also, the robot calibration apparatus may perform the calibration operation a plurality of times to determine varying moving errors due to the components and weight of the robot arm to increase the accuracy of the movement of the robot arm.

Figure 5:
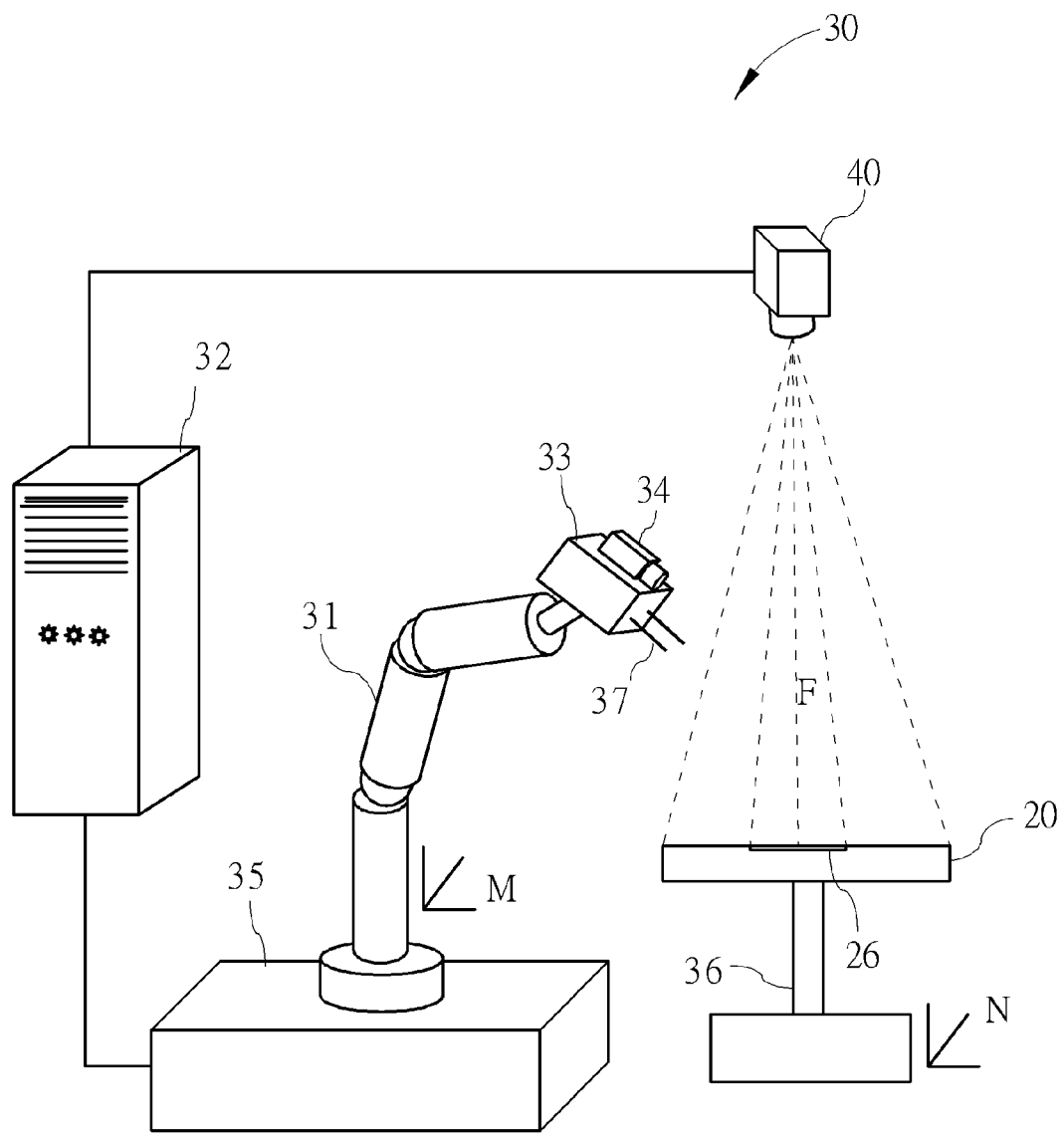
FIG. 5 illustrates a diagram of a robot calibration apparatus according to another embodiment of the present invention.

FIG. 5 illustrates a diagram of a robot calibration apparatus 30 according to another embodiment of the present invention. Aside from the eye in hand camera 34, the visual system of the robot calibration apparatus 30 may further comprise an eye to hand camera 40. Before calibration, initial coordinates of the eye to hand camera 34 with respect to the reference point M may be set. The eye to hand camera 40 may be configured to capture an image of a working environment of the robot arm 31 and guide the movable end 33 of the robot arm 31 to perform a task. The eye in hand camera 34 may then be used to capture an image of a target position of the task to allow the controller 32 to determine position where the task is to be performed. For example, the task of the robot arm 31 may be to grab an object. The controller 32 may move the movable end 33 of the robot arm 31 with respect to the reference point M to capture an image of the object and set the clamp 37 at the movable end 33 to perform the grabbing of the object. To accurately grab the object, the position of the eye in hand camera 34 and the eye to hand camera 40 may be calibrated separately. The calibration of the eye in hand camera 34 and the eye to hand camera 40 need not be performed in a specific sequence.

Since the calibration of the position of the eye in hand camera 34 has been discussed in the description above, it would no longer be repeated for brevity. And, as an example, the calibration of the eye in hand camera 34 may be performed first. After the position of the eye in hand camera 34 has been calibrated, the eye to hand camera 40 may be calibrated next. Before calibrating the position of the eye to hand camera 40, the movable end 33 of the robot arm 31 may be moved away from the encoded calibration plate 20. The support frame 36 may be used to fix the encoded calibrating plate 20 within a photographic range of the eye to hand camera 40. The position of the support frame may be taken as the reference point N. The position of the origin O in the encoded calibrating plate 20 with respect to the reference point N may be known. Hence, the position of the white squares 22 indicated by the coordinates encoding with respect to the reference point N may also be known. Also, the distance between the reference point M and the reference point N may be fixed. Thus, the reference point M and the reference point N may have fixed coordinates correlation. The fixed coordinates correlation between the reference point N and reference point M may be used to determine the correct coordinates of the eye in hand camera 34 with respect to the reference point M.

During calibration, the eye to hand camera 40 may be focused to capture a clear image of the encoded calibrating plate 20. If the distance between the eye to hand camera 40 and the encoded calibrating plate 20 is high enough, the eye to hand camera 40 may capture an image of whole of the encoded calibrating plate 20. If the distance between the eye to hand camera 40 and the encoded calibrating plate 20 is not high enough, the eye to hand camera 40 may only capture an image 26 of a part of the encoded calibrating plate 20. The coordinates with respect to the reference point N of the eye to hand camera 40 may be determined according to the focus F of the eye to hand camera 40 and the coordinates encoding captured in the image 26. Afterwards, the correct coordinates of the eye to hand camera 40 with respect to the reference point M may be determined to complete positioning of the eye to hand camera 40. A positioning error of the eye to hand camera 40 with respect to the reference point M may be determined by comparing the coordinates of eye to hand camera 40 with respect to the reference point M stored in the memory before calibration and the coordinates of eye to hand camera 40 with respect to the reference point M after calibration. The robot arm 31 may be able to perform movement more accurately after calibrating the positioning errors of the eye in hand camera 31 and the eye to hand camera 40.

Figure 6:
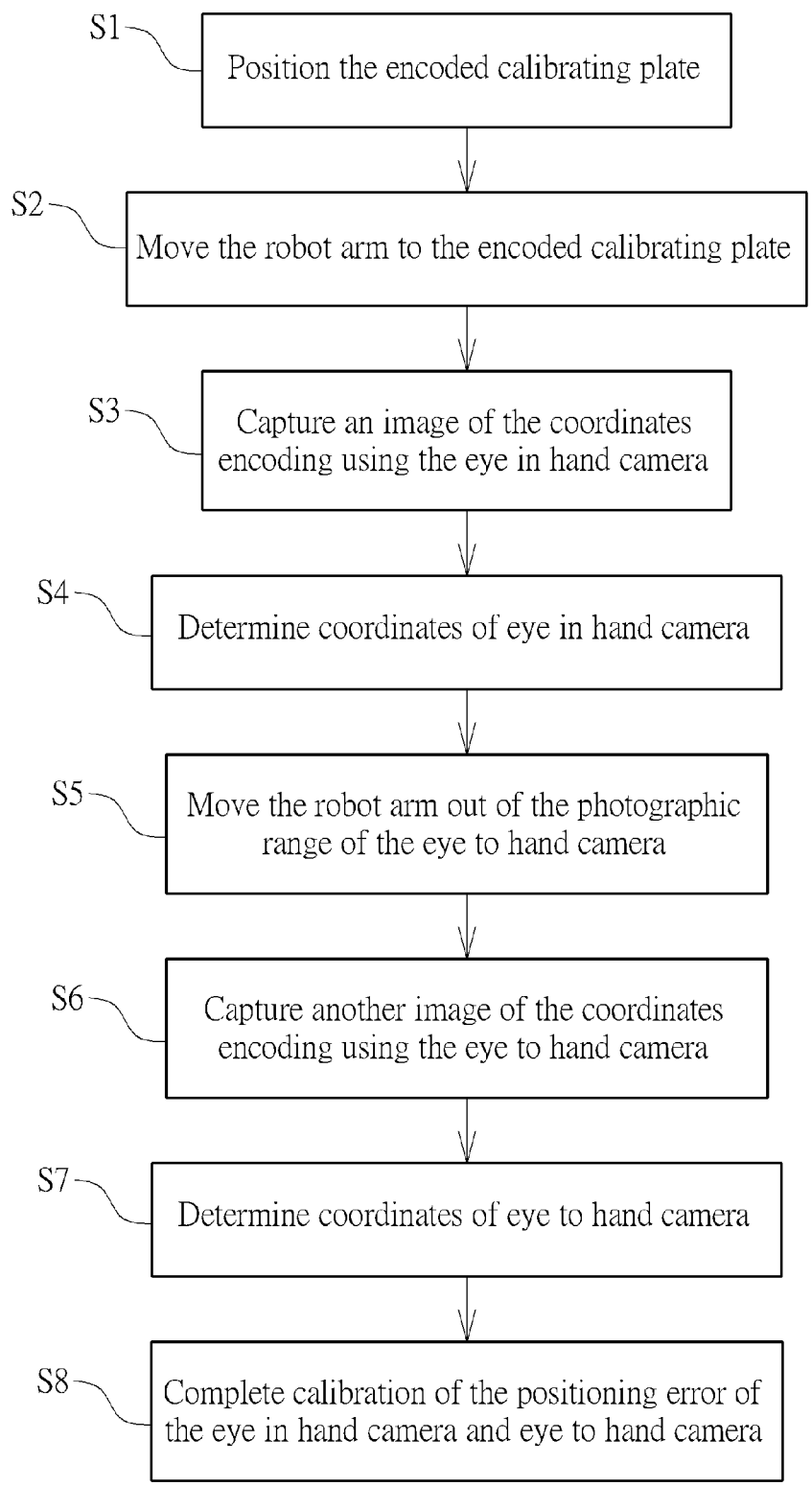
FIG. 6 illustrates a flowchart of a method of calibrating a visual system of a robot calibration apparatus in FIG. 5.

FIG. 6 illustrates a flowchart of a method of calibrating a visual system of a robot calibration apparatus in FIG. 5. The steps of the method of calibrating the visual system may include but is not limited to the following steps:

Step S1: position the encoded calibrating plate to be within a working environment of a robot arm, an eye in hand camera, and an eye to hand camera;

Step S2: move the robot arm to the encoded calibrating plate;

Step S3: capture an image of the coordinates encoding using the eye in hand camera;

Step S4: determine coordinates of eye in hand camera according to the image of the coordinates encoding captured by the eye in hand camera;

Step S5: move the robot arm out of the photographic range of the eye to hand camera;

Step S6: capture another image of the coordinates encoding using the eye to hand camera;

Step S7: determine coordinates of eye to hand camera according to the another image of the coordinates encoding captured by the eye to hand camera; and Step S8: complete calibration of the positioning error of the eye in hand camera and eye to hand camera.

For the visual system, positioning of eye in hand camera may be performed first. The positioning of eye in hand camera may comprise receiving coordinates of the eye in hand camera fixed on a moveable end of the robot arm relative to coordinates of a fixed end of the robot arm, capturing a first image of an encoded calibrating plate by the eye in hand camera, determining coordinates of the eye in hand camera indicated by a coordinates encoding in the first image, and an orientation indicated by an orientation encoding in the first image, determining correct coordinates of the eye in hand camera relative to the fixed end of the robot arm according to at least the coordinates indicated by the coordinates encoding in the first image, the orientation indicated by the orientation encoding in the first image, a focus of the eye in hand camera, and determining a moving error of the eye in hand camera according to the received coordinates of the eye in hand camera and the correct coordinates of the eye in hand camera. Afterwards, positioning of eye to hand camera may be performed by having a second image of an encoded calibrating plate captured by an eye to hand camera, and having coordinates of the eye to hand camera relative to the fixed end of the robot arm determined according to at least the coordinates indicated by the coordinates encoding in the second image, the orientation indicated by the orientation encoding in the second image, and a focus of the eye to hand camera.

Therefore, a robot calibration apparatus and method for calibrating a robot arm of the present invention may use an encoded calibration plate to separately calibrate the positioning of an eye in hand camera and an eye to hand camera of the robot arm and to calibrate a moving error of the robot arm.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A robot calibration apparatus, comprising:
   a robot arm having a fixed end fixed on a base and a movable end;
   a visual system configured to capture an image of a working environment of the robot arm;
   a controller configured to control a movement of the robot arm according to the image captured by the visual system; and
   an encoded calibrating plate fixed on the working environment of the robot arm, the encoded calibrating plate having a chessboard pattern, the chessboard pattern having encodings to indicate an orientation of the encoded calibrating plate and positions on the encoded calibrating plate;
   wherein the visual system captures images of encodings of the encoded calibrating plate to determine moving errors of the robot arm.

2. The robot calibration apparatus of claim 1, wherein the visual system comprises an eye to hand camera fixed outside the robot arm, and an eye in hand camera fixed on the movable end of the robot arm.

3. The robot calibration apparatus of claim 1, wherein squares of the chessboard pattern of the encoded calibrating plate are alternating black squares and white squares, the black squares having orientation encodings for indicating the orientation of the encoded calibration plate, the white squares having coordinates encodings for indicating the positions on the encoded calibration plate.

4. The robot calibration apparatus of claim 3, wherein each orientation encoding comprises an icon positioned near a corner of the black square for indicating that an origin of the encoded calibration plate is close to a corresponding corner of the encoded calibration plate.

5. The robot calibration apparatus of claim 3, wherein hollow icons and solid icons in the white squares are arranged to indicate positions of the white squares relative to an origin of the encoded calibration plate.

6. The robot calibration apparatus of claim 3, wherein encoding icons in one of the white squares are arranged in two columns, a first column of the two columns representing an X-coordinate of the encoded calibration plate and having encoding icons each representing a bit of the X-coordinate, a second column of the two columns representing a Y-coordinate of the encoded calibration plate and having encoding icons each representing a bit of the Y-coordinate.

7. The robot calibration apparatus of claim 6, wherein each of the X-coordinate and Y-coordinate comprises an encoding icon in row A, an encoding icon in row B, and an encoding icon in row C from bottom to top representing $2^0$, $2^1$ and $2^2$ respectively, equations for calculating the X-coordinate and the Y-coordinate are as follows:

$$X=A*2^0+B*2^1+C*2^2$$

$$Y=A*2^0+B*2^1+C*2^2$$

wherein A is a bit value of the encoding icon in row A, B is a bit value of the encoding icon in row B, C is a bit value of and the encoding icon in row C.

8. A method of calibrating a robot arm, comprising:
receiving coordinates of an eye in hand camera fixed on a moveable end of the robot arm relative to coordinates of a fixed end of the robot arm;
capturing a first image of an encoded calibrating plate by the eye in hand camera;
determining coordinates indicated by a coordinates encoding in the first image, and an orientation indicated by an orientation encoding in the first image;
determining correct coordinates of the eye in hand camera relative to the fixed end of the robot arm according to at least the coordinates indicated by the coordinates encoding in the first image, the orientation indicated by the orientation encoding in the first image, a focus of the eye in hand camera; and
determining a moving error of the eye in hand camera according to the received coordinates of the eye in hand camera and the correct coordinates of the eye in hand camera.

9. The method of claim 8, wherein determining the correct coordinates of the eye in hand camera relative to the fixed end of the robot arm according to at least the coordinates indicated by the coordinates encoding in the first image, the orientation indicated by the orientation encoding in the first image, the focus of the eye in hand camera comprises:
determining a first relative position between the first image and an origin of the encoded calibrating plate;
determining a second relative position between the origin of the encoded calibrating plate and reference coordinates;
determining a third relative position between the reference coordinates and the coordinates of the fixed end of the robot arm; and
determining the correct coordinates of the eye in hand camera relative to the fixed end of the robot arm according to the first, second and third relative positions.

10. The method of claim 8, further comprising:
capturing a second image of an encoded calibrating plate by an eye to hand camera; and
determining coordinates of the eye to hand camera relative to the fixed end of the robot arm according to at least the coordinates indicated by the coordinates encoding in the second image, the orientation indicated by the orientation encoding in the second image, a focus of the eye to hand camera.

11. The method of claim 10, wherein determining the coordinates of the eye to hand camera relative to the fixed end of the robot arm according to at least the coordinates indicated by the coordinates encoding in the second image, the orientation indicated by the orientation encoding in the second image, the focus of the eye to hand camera comprises:
determining a first relative position between the second image and an origin of the encoded calibrating plate;
determining a second relative position between the origin of the encoded calibrating plate and reference coordinates;
determining a third relative position between the reference coordinates and the coordinates of the fixed end of the robot arm; and
determining the coordinates of the eye to hand camera relative to the fixed end of the robot arm according to the first, second and third relative positions.

12. The method of claim 8, further comprising:
moving the robot arm to a different position and repeat calibration operation when a number of calibration times is less than a predetermined number.

13. The method of claim 12, further comprising:
storing an average of moving errors determined during calibration operations in a memory when the number of calibration times is equal to the predetermined number.

\* \* \* \* \*